Figures 1, 2:
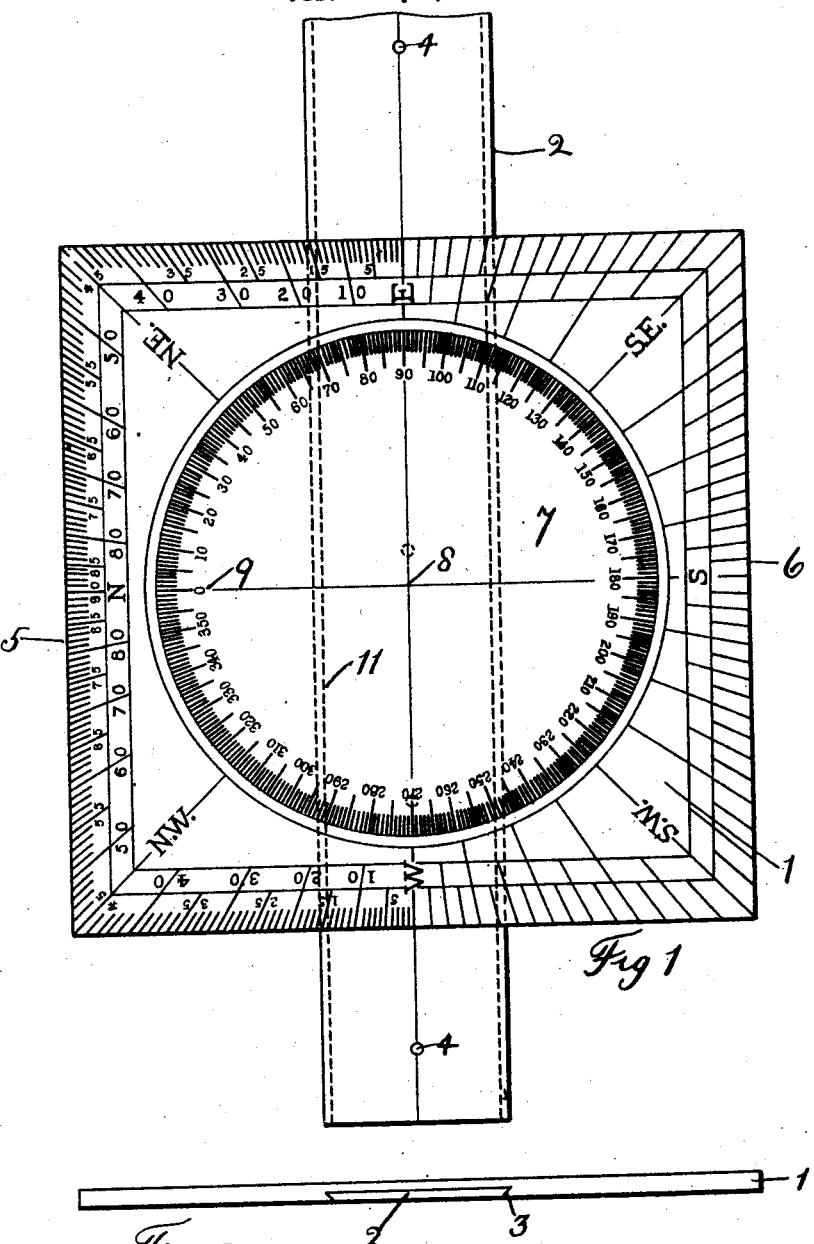

Oct. 9, 1928.

C. G. GUY 1,687,018

NAUTICAL POSITION FINDER

Filed July 6, 1926

Charles George Guy
Inventor
Attorney

Patented Oct. 9, 1928.

1,687,018

UNITED STATES PATENT OFFICE.

CHARLES GEORGE GUY, OF VANCOUVER, BRITISH COLUMBIA, CANADA.

NAUTICAL POSITION FINDER.

Application filed July 6, 1926. Serial No. 120,847.

This invention relates to instruments of precision used in connection with nautical charts for the purpose of taking observations of positions, the determination of correct course and other like matters.

As an instrument of general use in the drawing office, it also lends itself to a variety of usage.

The object of my invention is to provide a more satisfactory and a more convenient instrument than the ordinary parallel ruler with which such observations, measurements and calculations have hitherto been made.

When a parallel ruler is employed on a chart to facilitate measurements and observational work in regard to the setting of a course or for the finding or verification of a position at sea, it is a well recognized fact that such an instrument is both slow and faulty in operation, readily producing inaccuracies and necessitating much checking and rechecking in consequence.

It is these defects which my instrument is designed to meet and eliminate.

My invention provides a sliding ruler in combination with a movable protractor and by its inherent advantages affords the greatest possible facility of manipulation in chart observations.

My device consists in its preferred form of a square of transparent celluloid having a dovetailed slot across its centre in which a separate, flat member, materially longer than the square, freely slides.

Within the square is a circle marked off in degrees, while external to the circle there are angular divisions corresponding to the points of a nautical compass and to degrees.

The principal features of this arrangement are that by sliding the square member along the flat member to any convenient position on the chart immediate comparison can be effected with a meridian or magnetic line, as the case may be. Moreover, the instrument affords an effective set square or parallel ruler which is far more efficient than such conventional instruments now in use, as will be made clear hereinafter.

The invention is more clearly described by the aid of the drawings which form a part of this application, in which Fig. 1 is a plan, and Fig. 2, an end elevation of the instrument.

Taking the drawings in detail, the instrument preferably comprises two pieces of celluloid, the square member 1 and the flat member 2, the latter sliding in a dovetailed groove 3 and being provided for convenience of manipulation with holes at intervals for the insertion of a pencil point, as shown at 4.

The periphery 5 of the square member 1 is marked off around one half in degrees and in the other half to correspond with the points of the compass in the usual way, as shown at 6. Within the square member is a circle 7 having a central intersection at 8 and divided around its periphery into angular degrees and numbered, starting from a zero point at 9 and continuing consecutively in a clockwise direction to 360 degrees.

The central circular scale may, if desired, be carried by a member which is independent of the square member 1 and slidable upon it, but the simpler construction is the preferred one.

It is to be noted that the instrument being of clear celluloid is transparent and thus lends itself to observational work on charts with the utmost precision, and at the same time avoiding the usual errors due to the manipulation of a parallel ruler. Moreover, the character of the celluloid being slightly flexible renders it available for work on more or less imperfect surfaces, a condition which often obtains in practical navigational use.

Whilst its prime purpose is for navigational purposes, it is obvious that the instrument has a large variety of uses for ordinary drawing office practice.

The zero line of the circular scale may be either coincident with the longitudinal centre line of the flat member 2, or it may be at right angles thereto.

When using the device for navigating purposes, such as finding the course or bearings, any of the longitudinal lines of the flat member 2, such as its centre line or upper or lower edge, is placed to coincide with the course line, the protractor-member 1 being well towards either end of the flat member 2. The latter is then held firmly to the chart and with a light, easy movement the protractor is slidden to the right or left until the intersection of the lines at the centre 8 coincides with the meridian. The actual degrees of the course line can then be read by inspection of the point where the meridian crosses the circular scale or the quadrant markings, as the case may be. This will be the true course or bearing.

Should it be desired to get the magnetic course or bearing, the North and South line of the protractor or square member 1 is placed on the course or bearing line with the flat member 2 pointing approximately in the direction of the nearest magnetic compass on the chart and there held firmly whilst the square member 1 or protractor is slidden along until its edge meets the centre of the magnetic compass.

The magnetic course or bearing is shown where the same edge bisects the inner chart compass. Other simple manipulations of the device are obvious and do not need elaboration.

Having now fully described my invention, what I claim is:

A navigational instrument of the type described comprising, a rigid square flat transparent member having angular divisions indicated on the surface adjacent its periphery, said angular divisions on one half of the periphery corresponding to the divisions of the mariner's compass, concentric circular lines on the surface of and centrally disposed on said square member, said concentric circular lines being angularly subdivided by radial lines, a rigid and relatively long flat rectangular and transparent member of the nature of a flat ruler centrally connected to said square member, a shallow recess in the underside of said square member adapted to receive in slidable relation said flat rule member whereby when said ruler member is rigidly positioned upon a chart the said square flat member may be slidden along it to any desired position thereupon.

In testimony whereof I affix my signature.

CHARLES GEORGE GUY.